United States Patent [19]
Hazan

[11] Patent Number: 5,536,097
[45] Date of Patent: Jul. 16, 1996

[54] ASSEMBLY SYSTEM FOR THE CONSTRUCTION OF MODULAR FURNITURE

[76] Inventor: Jacques Hazan, 37/59 Quai de Grenelle, Paris, France, 75015

[21] Appl. No.: 210,917

[22] Filed: Mar. 21, 1994

Related U.S. Application Data

[63] Continuation-in-part of Ser. No. 960,429, Jan. 19, 1993, abandoned.

[30] Foreign Application Priority Data

Oct. 4, 1991 [FR] France ................................ 91 04891
Oct. 4, 1992 [WO] WIPO .................... PCT/FR92/00318

[51] Int. Cl.$^6$ ................................................ F16D 1/00
[52] U.S. Cl. ..................... 403/171; 403/174; 403/217; 403/362; 403/231; 29/525.02
[58] Field of Search ................................ 403/170, 171, 403/174, 176, 217, 43–45, 48, 231, 258, 362; 285/397; 29/525.1, 282, 272

[56] References Cited

U.S. PATENT DOCUMENTS

| | | | |
|---|---|---|---|
| 159,105 | 1/1875 | Light ........................... | 403/48 X |
| 2,238,561 | 4/1941 | Goodyear ..................... | 403/174 X |
| 2,609,638 | 9/1952 | Lindenmeyer ................ | 403/174 X |
| 3,980,408 | 9/1976 | Jachmann ..................... | 403/171 X |
| 4,036,371 | 7/1977 | Michel ......................... | 403/231 X |
| 5,062,732 | 11/1991 | Ballerstein .................... | 403/174 |

Primary Examiner—Peter Vo
Assistant Examiner—Khan V. Nguyen
Attorney, Agent, or Firm—Omri M. Behr; Matthew J. McDonald

[57] ABSTRACT

A modular system uses a plurality of metal pipes each having an orthogonal array of coplanar openings at one end and a threaded bore at the other end. An insert is inserted in a first pipe bore at one end next to the openings, the insert having a set of like threaded bores aligned with the openings. A coupling member external the pipe is aligned with each opening and has a bore aligned with these openings. A plurality of bolts each with a threaded end is attached to a different threaded insert bore through a coupling member and pipe opening. The bolts each have an annular groove which is aligned with a threaded bore at a second pipe other end. A set screw in the second pipe threaded bore secures the bolt by engaging the groove, locking the second pipe to the first. A foot is threaded to a lowermost vertical pipe and an end cap is used as insert for the uppermost vertical pipe. A number of second pipes aligned in a horizontal plane are connected to other joints similarly to form a three dimensional interconnected pipe structure to which panels are attached to form furniture and the like. Another embodiment includes two axially attached pipes secured by a ribbed threaded bore insert in interference fit in each pipe. A stud is threaded to each insert through an end collar of each pipe. An internal sleeve bearing between the collars is surrounded by a ring having a threaded bore for receiving a grooved bolt which is secured perpendicularly to the stud and two pipes to a third pipe.

2 Claims, 7 Drawing Sheets

5,536,097

ASSEMBLY SYSTEM FOR THE CONSTRUCTION OF MODULAR FURNITURE

This application is a continuation in part of application Ser. No. 07/960 429 filed Jan. 19th, 1993, now abandoned, entitled Assembly Process for the Construction of Modular Furniture and the Furniture thus made.

BACKGROUND OF THE INVENTION

FIELD OF THE INVENTION

The present invention relates to modular joint construction, and, in particular, for joints for fabricating furniture such as office furniture and the like.

DISCUSSION OF THE PRIOR ART

Today, in interior design and especially in the composition of office furniture, modular furniture is important both functionally and aesthetically. Office furniture should allow space saving, be highly functional and adaptable to any type of office equipment, have an aesthetic quality which harmonizes with the rooms where it is installed and above all alloy assemblies of different pieces of furniture having different shapes, sized and functions. Thus, units are arranged either in the same longitudinal plane or in one or more perpendicular planes, the sizes of which can change, the composition of which can vary as a function of the development of office equipment and the constitutive elements of can be assembled, in height or in length, according to vertical or horizontal axes. In this way modular furniture is obtained having aligned or recessed elements for desks or elements arranged at different levels.

In this way, bookcases, display cabinets, writing desks can be formed which can be assembled or juxtaposed so as to obtain an even presentation, a stable and solid implementation which is adapted to all situations.

SUMMARY

The present invention is to provide an assembly permitting the construction of modular furniture elements using a modular joint construction. A modular joint construction according to the present invention for connecting a first tube to a second tube, the second tube having a longitudinal bore and first locking means in a side wall thereof adjacent a tube end in communication with the second tube bore, the combination comprising a first tube open at at least one end and having an inner bore extending along a longitudinal axis, the tube having an opening in a side wall thereof adjacent the at least one end and extending transverse the axis. An insert member axially extends in the first tube bore at the one tube end, the member having a threaded bore extending transverse the longitudinal axis and aligned with the opening. A tube coupling member abuts the first tube at the one end side wall, the member having a bore extending along the first tube longitudinal axis and aligned with the opening and insert member threaded bore, the coupling member for closely receiving the second tube bore. A first bolt has a shank with one end threaded and the other opposite end not threaded, the opposite end including second locking means which mate with the first locking means for locking the second tube to the bolt, the bolt threaded one end being engaged with the threads of the insert member threaded bore through the opening, the bolt shank extending through the coupling member bore transverse the first tube axis, the bolt opposite end for receiving the second tube bore with the bolt second locking means aligned with second tube first locking means for engaging and locking the second tube to the first tube.

In a further embodiment the first locking means comprises a screw threaded to the second tube and the second locking means comprises a recess in the bolt for selectively receiving the screw.

In a still further embodiment the insert member has a threaded bore extending along the first tube axis and includes a second bolt substantially the same in construction as the first bolt and threaded to the axial threaded bore of the insert member.

In a further embodiment, a first tube is open at at least one end and has an inner bore extending along a longitudinal axis, the tube having an opening in a side wall thereof adjacent the at least one end and transverse the axis. A screw is provided and thread means are coupled to the tube side wall at the opening for adjustably securing the screw in communication with the tube inner bore transverse the longitudinal axis. A second tube is open at at least one end and has a second inner bore extending along a second longitudinal axis, the second tube axis being transverse the first tube axis, the second tube having a second opening in a side wall thereof adjacent to its one end. An insert member axially extends in the second tube bore at its one tube end, the member having a transverse threaded bore aligned with the second opening.

A tube coupling member abuts the second tube at the one end side wall thereof, the member having a bore extending along the first tube longitudinal axis and aligned with the second opening and insert member threaded bore, the coupling member for closely receiving the first tube bore. A bolt has a shank with one end threaded and the other opposite end not threaded with an annular groove therein, the bolt threaded one end being engaged with the threads of the insert member threaded bore through the second opening, the bolt shank extending through the coupling member bore, the bolt groove being in the first tube bore and aligned with and engaged by the screw engaged with the thread means for locking the second tube to the first tube.

A joint construction according to a further embodiment of the present invention comprises first and second hollow metal tubes each having a bore extending along a longitudinal axis. A pair of hollow cylindrical inserts are included with a threaded through bore extending in an axial direction, the inserts each having an outer cylindrical grooved surface with axially extending grooves, each insert being in interference fit in a corresponding different tube bore with the insert bores and corresponding tube bores extending in the same axial direction to thereby axially lock the insert in each tube bore. A collar is secured in each tube bore at a corresponding tube end, each collar having an axially extending bore and a surface lying in a plane transverse the collar bore.

A central axially extending circular cylindrical sleeve is between the collars. A ring member is rotatably secured for rotation about the axially extending sleeve and in abutting sliding contact with the collar surfaces between the collars, the ring member having at least one threaded bore extending transverse the tube longitudinal axes. An axially extending bolt is threaded to the inserts for securing the first and second tubes to each other. A transversely extending bolt is adapted to secure a further tube thereto in an axial direction transverse the longitudinal bore of the first and second tubes, the bolt being threaded to the ring member threaded bore for securing the further tube to the first and second tubes.

DESCRIPTION OF THE PREFERRED EMBODIMENTS

Figure 1:
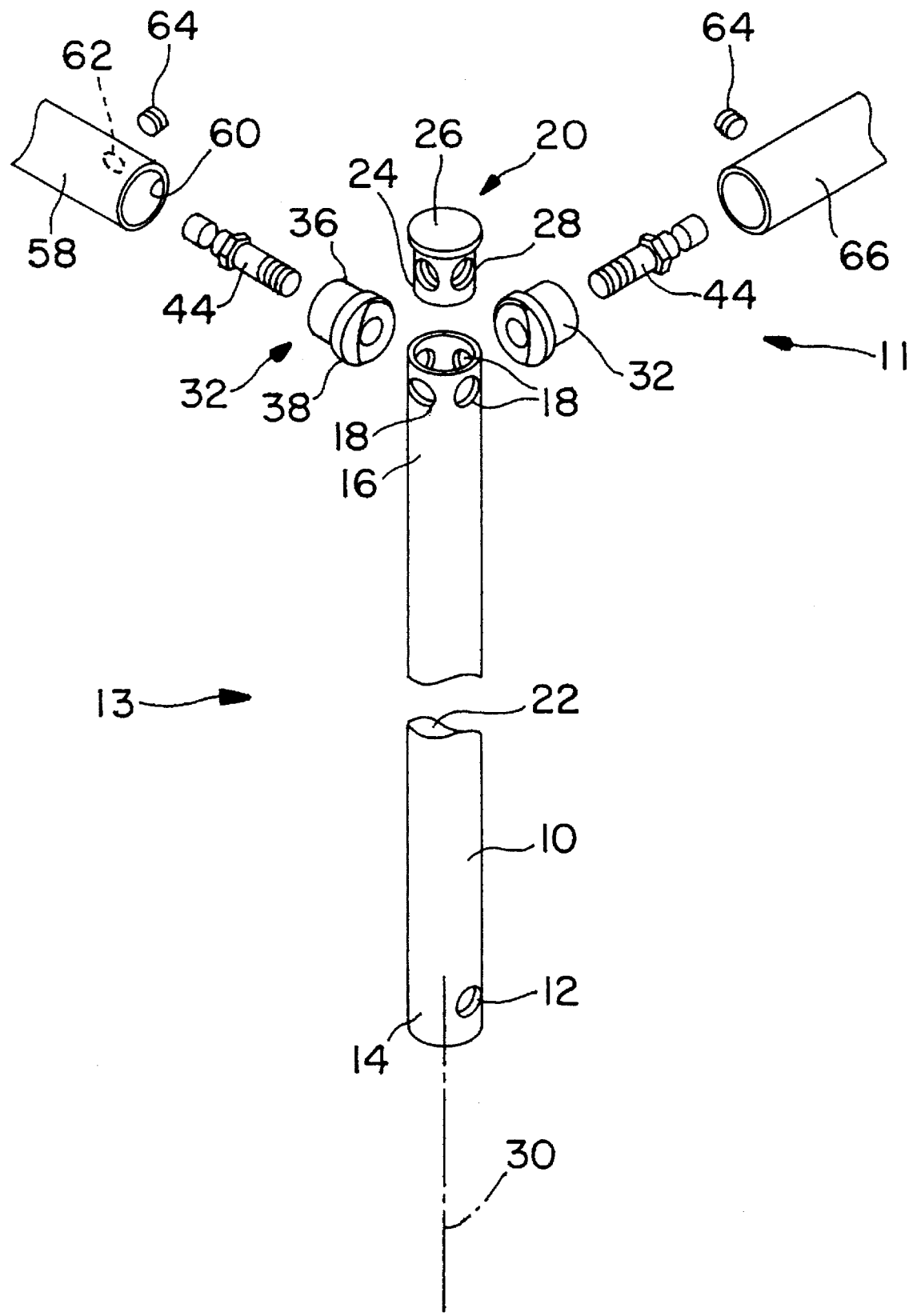
FIG. 1 is an exploded view of an upper portion of a modular joint construction assembly according to one embodiment of the present invention.

In FIG. 1, joint 11 is at the upper end of a modular frame assembly 13 comprising a plurality of tubes and joints. Joint 11 is representative of other upper joints not shown which form a completed frame assembly 13. The frame assembly 13 is used to secure panels thereto (not shown) to form sides, tops and bottoms of modular furniture. Assembly 13 joint 11 includes a hollow vertical (relative to the force of gravity) metal tube 10 having a plurality of threaded openings 12, only one being shown, arranged in orthogonal directions and spaced from tube lower end 14. Spaced from the tube upper end 16 are a plurality of orthogonal spaced coplanar openings 18. An end cap 20 is closely received in the upper end 16 of tube 10 bore 22.

Figure 9:
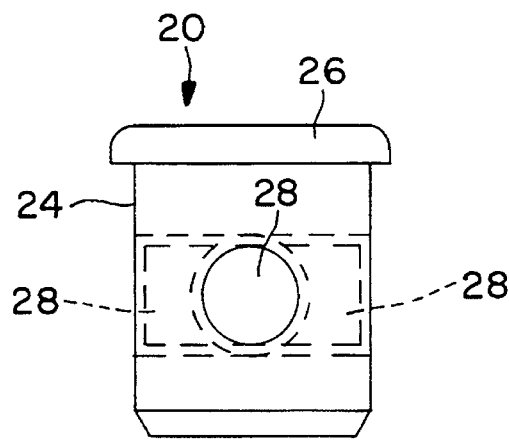
FIG. 9 is a side elevation view of a component used in the embodiment of FIG. 1.

In FIG. 9, end cap 20 comprises a tubular insert 24 and an integral flange 26 at one end of insert 24. Cap 20 is metal and has a plurality of orthogonal threaded bores 28. Each bore 28 is aligned with a different opening 18 in a direction transverse the longitudinal axis 30 of tube 10.

Figure 8:
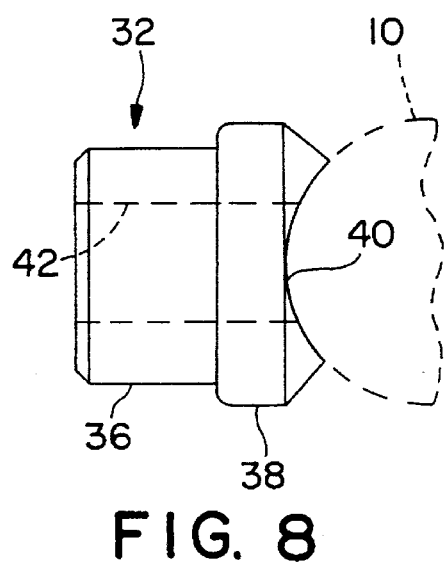
FIG. 8 is a side elevation view of a component used in the embodiment of FIGS. 1 and 2.

A coupling member 32 abuts tube 10 over one of the openings 18 and a second coupling member 32 abuts tube 10 over a second opening 18. Further coupling members may be used depending on the number of horizontal tubes 34 to be transversely secured to the joint 11. By way of example, two horizontal tubes 34 are shown for illustration, but more are used in this embodiment. In FIG. 8, member 32 comprises a cylindrical sleeve portion 36 and an end portion 38 having a circular concave segment surface 40 which closely abuts the external surface of tube 10. Member 32 has a circular cylindrical bore 42 in communication with both ends of member 32. Bore 42 is aligned with an opening 18 of tube 10.

Figure 4:
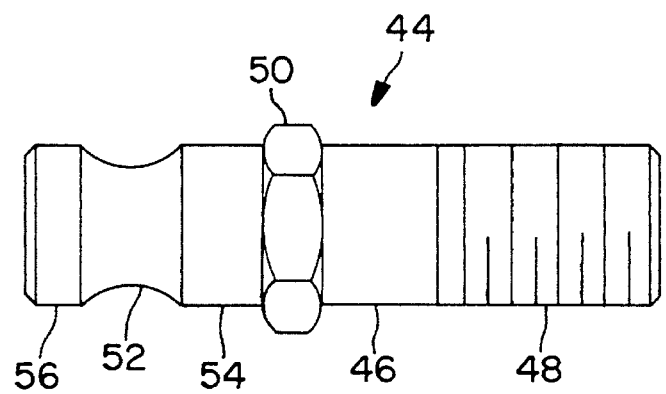
FIG. 4 is a side elevation view of a bolt used in the embodiments of FIGS. 1, 2 and 3.

In FIG. 1, a bolt is passed through member 32 bore 42 and threaded to insert bore 28. In FIG. 4 bolt 44 comprises a steel shank 46 having threads 48 at one end. A transverse hexagonal flange 50 used to turn the bolt with a conventional wrench is approximately midsection of the shank 46. A circular concave segment annular groove 52 is formed in and about shank portion 54 on a side of flange 50 opposite threads 48. The shank terminates at a cylindrical head 56. The threads 48 are threaded to a threaded bore 28 of cap 20 (FIG. 9). Shank 46 passes through the bore 42 of coupling member 32 FIG. 8.

Figure 12:
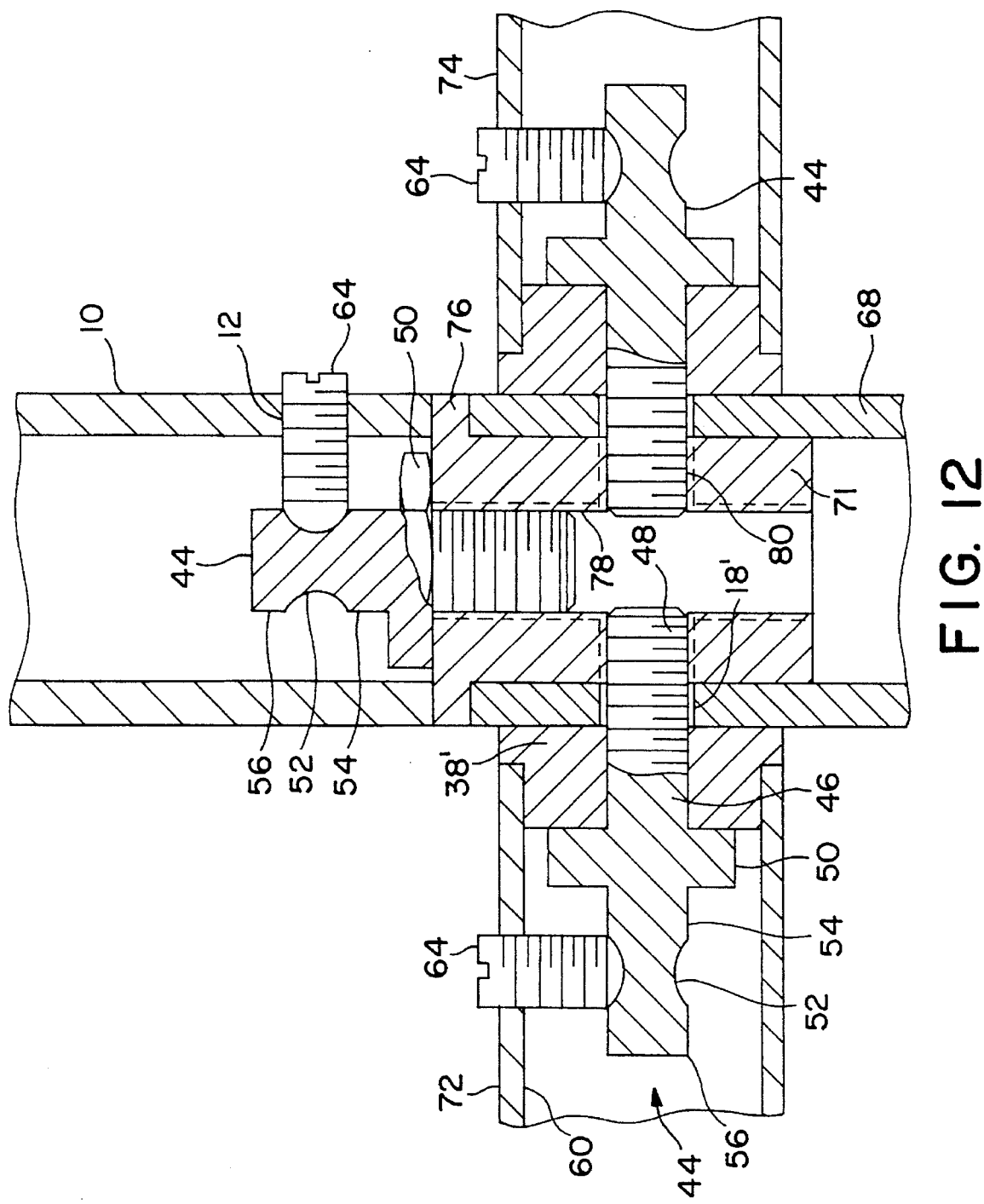
FIG. 12 is a side elevation sectional view of a representative embodiment of a joint used in the embodiment of FIG. 2.

A metal tube 58, FIG. 1, has a bore 60. The shank portion 54, groove 52 and head 56 of bolt 44 are inserted in the tube bore 60. The sleeve portion 36, FIG. 8, of member 32 is closely received in bore 60 so the end of tube 58 abuts the member 32 flange 38. The tube 60 has a threaded bore 62 which is identical to threaded bore 12 in tube 10 and receives a set screw 64. In the alternative or in addition to the threaded bore 62, an additional member not shown with a threaded aperture may be welded or otherwise attached to tube 58 in the bore 60 or at the external tube surface to receive the screw 64. The screw 64 engages groove 52 of the bolt 44 to axially lock the tube to the bolt. This is shown in FIG. 12 by way of example for the embodiment of FIG. 2 which is identical in this respect to the embodiment of FIG. 1. In FIG. 1 tube 66 in the same horizontal plane as tube 58 is secured to tube 10 in an identical fashion with identical components.

Figure 2:
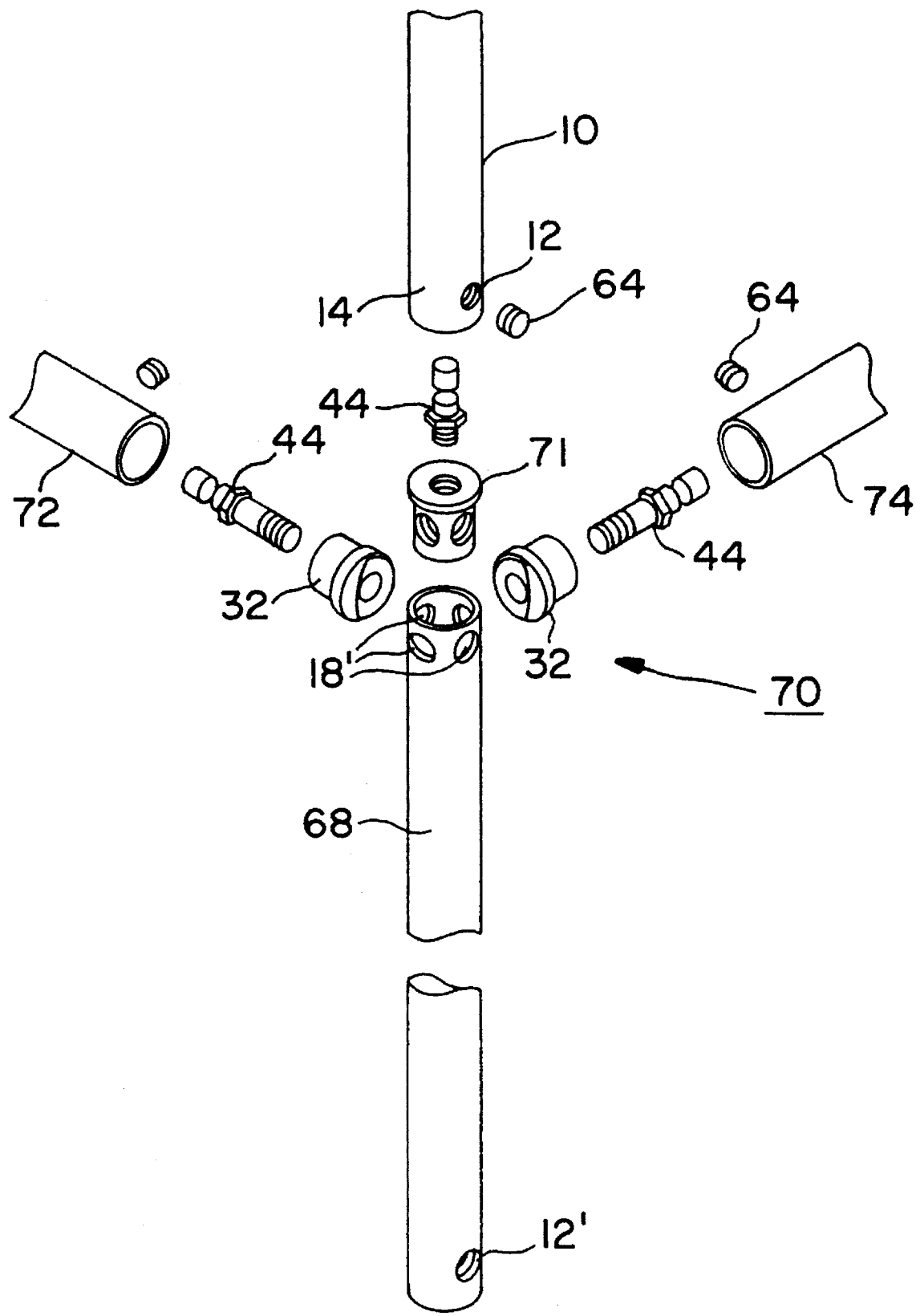
FIG. 2 is an exploded view of a midsection portion of a modular joint construction according to an embodiment of the present invention.

In FIG. 2, a further metal tube 68 is secured to and beneath tube 19 by joint 70. Except for different lengths according to a given implementation the tube 68 which is axially aligned with tube 10 vertically is otherwise identical to tube 10, as are all of the tubes described herein. For example tube 68 has openings 18' at the upper end and threaded bores 12' at the lower end which are identical to the openings 18 and bore 12 of tube 10. An insert 71 however is used in this case for the intermediate midsection joint 70. Insert 71 in FIG. 6 has an upper flange 76 and a central threaded axial bore 78 therethrough. Orthogonal threaded bores 80 are transverse to and in communication with bore 78. The threads of bores 80 are identical to the threaded bores 28 of cap 26, FIG. 1. The bores 78 and 80 each receive the threaded shank end of a bolt 44. A coupling member 32 is used with the horizontal tubes 72 and 74.

The groove 52 of bolt 44 attached to tube 10 lower end, FIG. 2 is secured by a set screw 64 in bore 12 of tube 10. A similar set screw secures the tubes 72 and 74 to the respective bolts 44 secured to the insert 71 and tube 68. FIG. 12 shows the connection of the elements of joint 70 which are representative.

Figure 6:
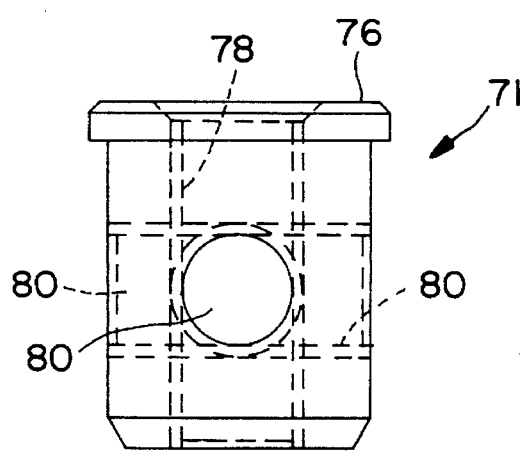
FIG. 6 is a side elevation view of a component used in the embodiment of FIG. 2.
Figure 7:
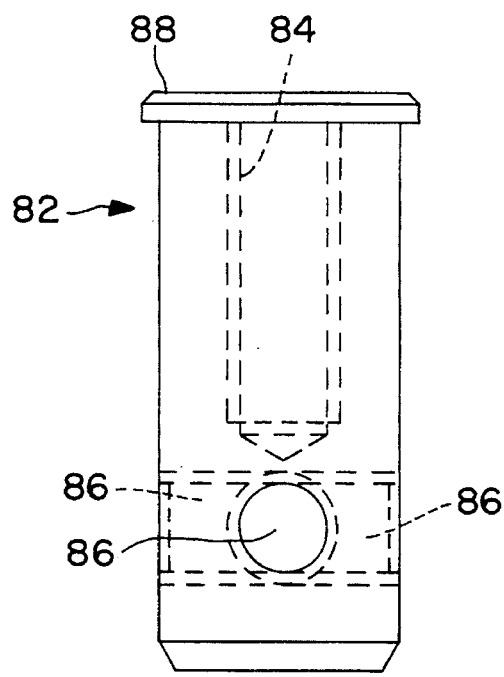
FIG. 7 is a side elevation view of an alternate component used in the embodiment of FIG. 2.

In FIG. 7, an alternative insert 82 may be used in place of insert 71 of FIG. 6. Insert 82 differs in that its threaded axial bore 84 terminates while the plane of threaded bores 86 is spaced from the axial bore 84. This positions the horizontal transverse tubes further away axially from the flange 88 of the insert 82. Otherwise insert 82 is similar to insert 71.

Figure 3:
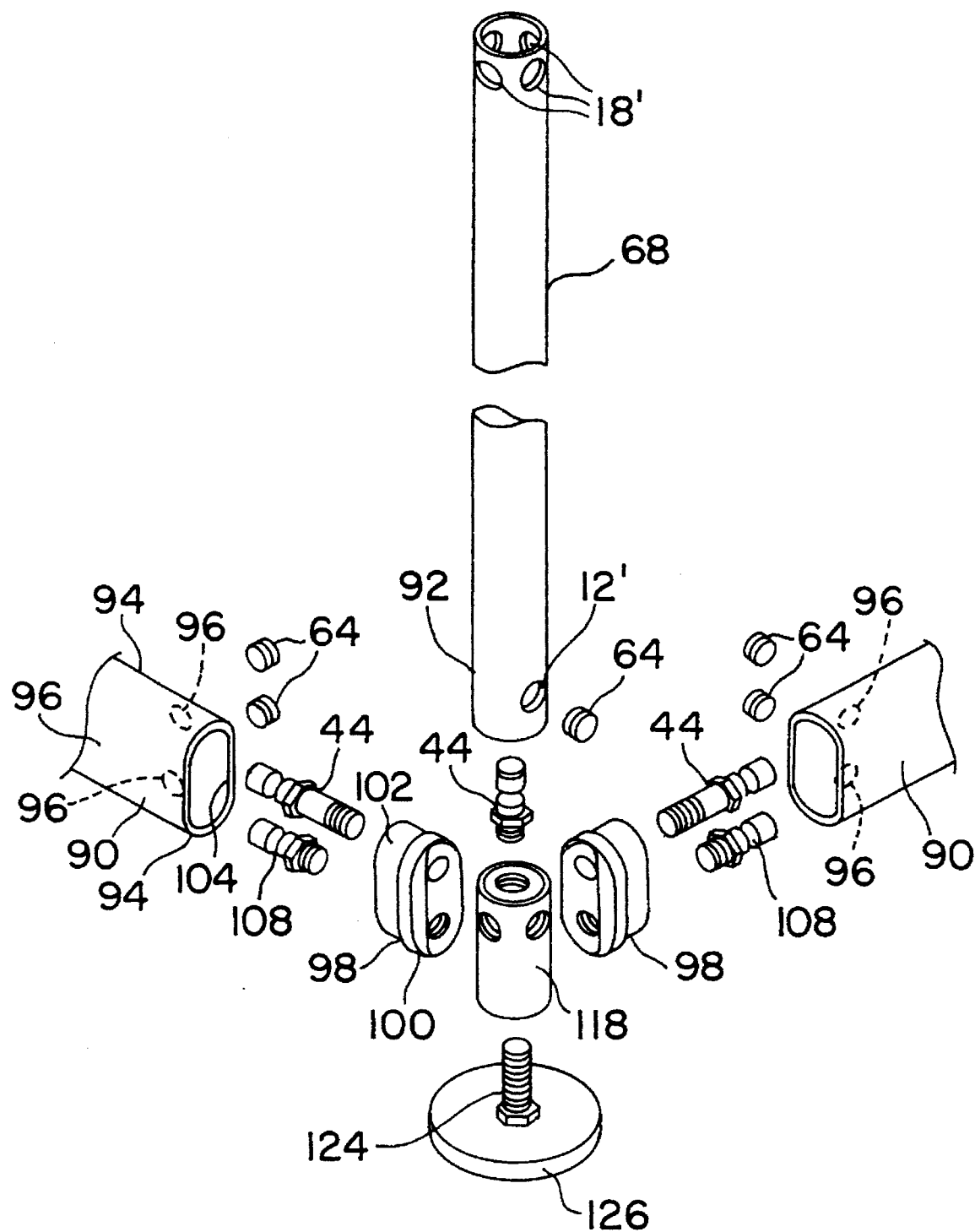
FIG. 3 is an exploded view of the lower portion of a modular joint construction according to an embodiment of the present invention.

In FIG. 3, a pair of oval tubes 90 are connected to the lower end 92 of tube 68. The tubes 90 comprise semicircular portions 94 connected by a straight portion 96. The tubes 90 each have a pair of set screw 64 receiving threaded bores 96.

Figure 10:
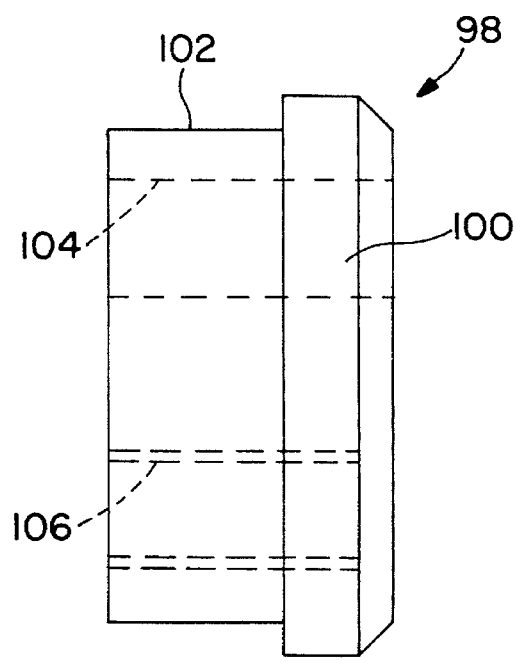
FIG. 10 is a side elevation view of a component used in the embodiment of FIG. 3.

A coupling member 98 couples a corresponding tube 90 to the tube 68 lower end 92. In FIG. 10, member 98 comprises an oblong tube receiving curved face flange 1 00 of the same external shape as the tube 90 and an oval sleeve 102 which is closely received in the bore 104 of a tube 90. Member 90 has a cylindrical upper bore 104 for receiving the shank of a bolt 44. Member 90 has a lower blind threaded bore 106 for receiving the threaded end of a second bolt 108.

Figure 5:
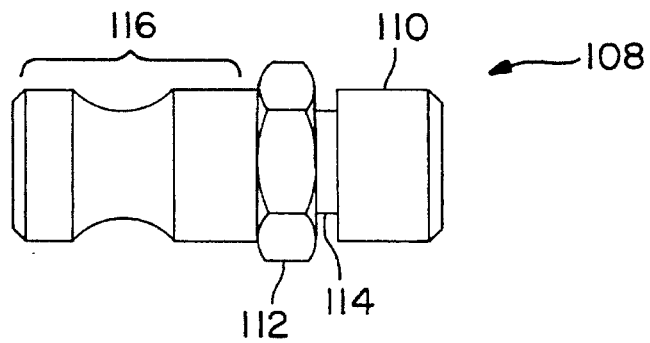
FIG. 5 is a side elevation view of a second bolt used in the embodiment of FIG. 3.

Bolt 108, FIG. 5, is the same as bolt 44 but is shorter. The threads 110 are connected to the hexagonal flange I 12 by an undercut 114. The groove portion 116 of the shank is the same as that of the bolt 44. The threads 110 engage the threaded bore 106 of the member 90. The two bolts 44 and 108 of tube 90 align and secure the tube in the desired orientation shown.

Figure 11:
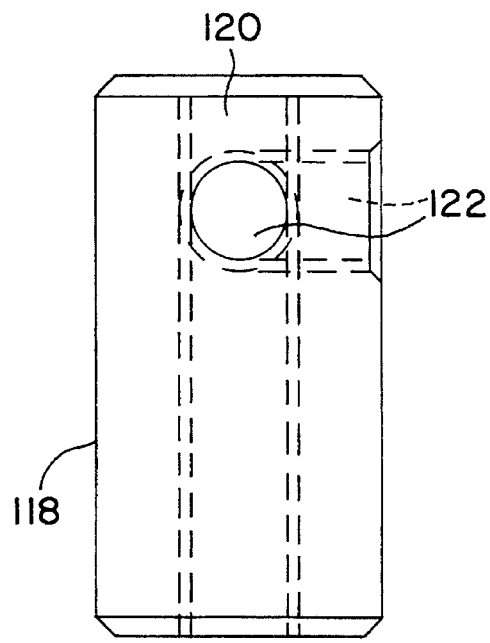
FIG. 11 is a side elevation view of a component used in the embodiment of FIG. 3.

A lower insert 118 has an axially extending bore 120, FIG. 11, and a set of orthogonal horizontal threaded bores 122 for receiving the threads 48 of a corresponding bolt 44. Bore 120 at its upper end receives a vertically oriented bolt 44 which is secured to the lower end of vertical tube 68 via a screw 64 as described previously. Bore 120 at its lower end receives the thread shaft 124 of a foot 126.

Figure 13:
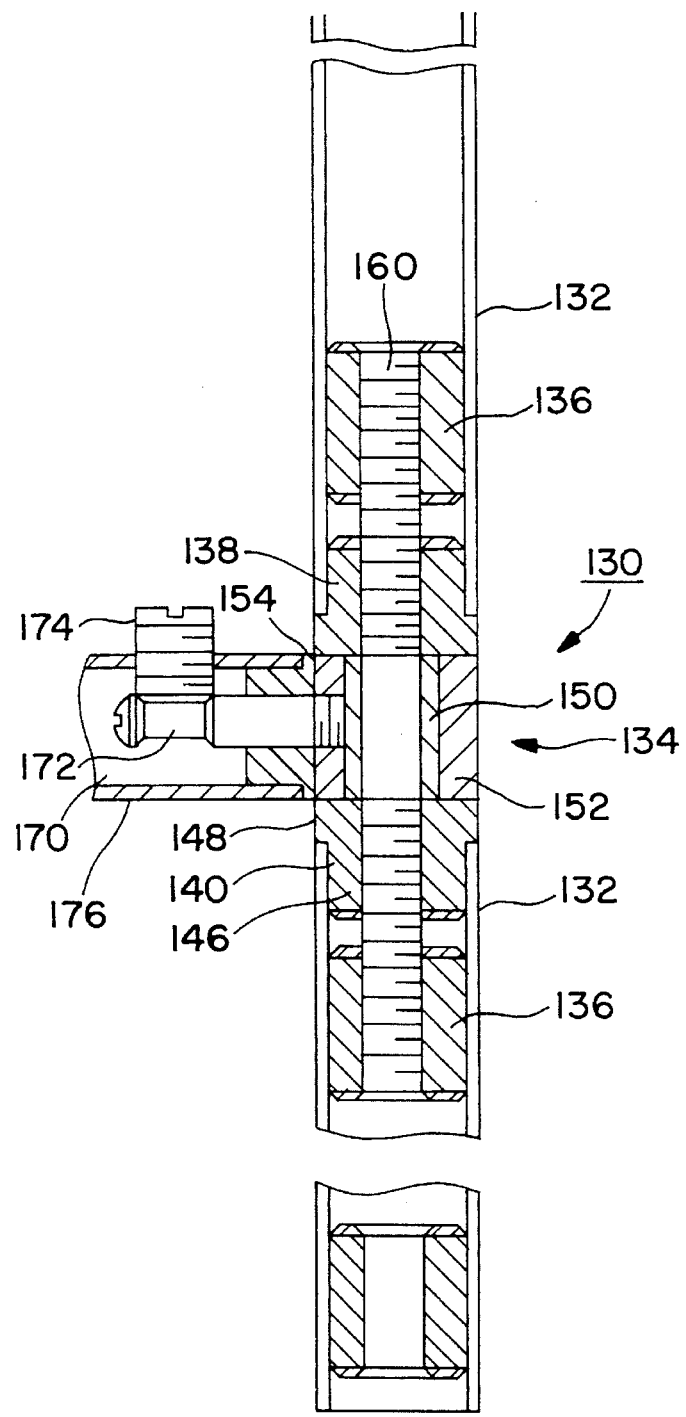
FIG. 13 is a side elevation sectional view of a representative second alternative embodiment of a joint construction according to the present invention.
Figure 14:
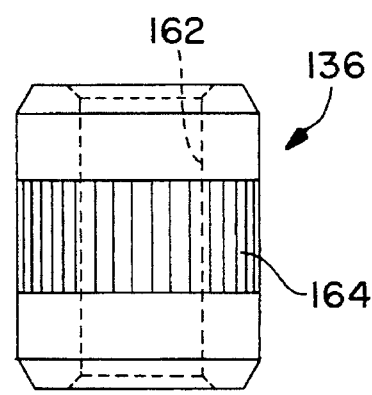
FIG. 14 is a side elevation view of a component used in the embodiment of FIG. 13.

In FIG. 13, an alternative embodiment is illustrated for use in scaffolding and the like using straight tubes which permit other tubes to be connected without bulges and unsightly joints. Joint assembly 130 includes straight tubes 132 connected by joint 134. Joint 134 includes an insert 136 in each tube 132, a collar 138 fixed in the end bore of one of the tubes and a collar 140 in the other tube end. Each collar 138 and 140 comprises a sleeve portion 146 and a flange portion 148, the flange portion abutting the tube end edge and the sleeve portion being closely received within the tube bore. A sleeve member 150 is between the collars 138 and 140, the collars being the same construction. A ring 152 surrounds the sleeve member 150 and rotates relative thereto, the member acting as a journal. A threaded bore 154 is in the ring 152. A threaded stud member 160 is threaded to the threaded internal bore 162 of inserts 136, FIG. 14. The insert 136 external surface has axially extending ridges 164 which are in interference fit with the tube 132 bore to axially fix the insert in place in this bore. This secures the member 160 to the tubes 132 in the axial direction. Member 160 is closely received in the bores of collars 138 and 140 and sleeve member 150.

A bolt 170 is threaded to bore 154 of ring 152 and has an annular groove 172 for receiving a set screw 174 for locking a tube 176 to the ring 152. Assembly 130 is modular and is repeated axially for as many repetitions as desired. Other parallel joint assemblies, not shown are also used to form a completed structure.

Once the assembly is assembled, there are no bumps, bulges or spherical balls used. There are no projecting surfaces. The ring 152 is rotationally locked once a tube 176 is secured in place.

Thus it is possible step by step to erect a tubular scaffold of square, rectangular or polyhedric shape using interlocking modular elements. The joints present a smooth external surface with a homogeneous arrangement. This system allows the assembly in any direction of a group of tubular elements.

Panels are between the tubes and have profiled areas to be inserted astride the tubular parts. The panels are perfectly fixed in place via grooves not shown and can be removed only by pressure or extraction following a movement exerted from the inside to the outside. Furniture can be made by allowing doors to be filed by flaps, brackets or glass partitions fixed on the tubular elements.

Rigid partitions may be used and inserted between the tubes via grooves in the tubes. Storage or filing assemblies are formed and may included elements for hanging files or cupboards, bookcases or display cases. The partitions may be opaque such as wood or metal, or may be transparent or translucent material such as glass or a polycarbonate polymer. Such elements may be transparent on one side and opaque on the other side.

By way of example, the bolt head may be of 8 mm diameter and an axial length of 6 mm. The groove 52 may subtend an angle of about 225°. The flange 50 of bolt 44 may be any polygon. As a result an easily assembled interlocking modular assembly is provided which can be assembled with any number of tubes in any direction.

The frame assembly can be of any number of levels, using a foot at the lowermost level and an upper cap at the uppermost level for each set of vertical tubes.

While particular embodiments have been disclosed, these are given by way of example and not limitation. Various modifications may be made by one of ordinary skill in the art. It is intended that the scope of the invention is as defined in the appended claims.

What is claimed is:

1. A joint construction comprising:
   first and second hollow metal tubes each having a bore extending along a longitudinal axis;
   a pair of hollow cylindrical inserts with a threaded through bore extending in an axial direction, said inserts each having an outer cylindrical grooved surface with axially extending grooves, each said insert being in interference fit in a corresponding different tube bore with the insert bores and corresponding tube bores extending in the same axial direction to thereby axially lock the insert in each tube bore;
   a collar secured in each tube bore at a corresponding tube end, each collar having an axially extending bore and a surface lying in a plane transverse the collar bore;
   a central axially extending circular cylindrical sleeve between the collars;
   a ring member rotatably secured for rotation about the axially extending sleeve and in abutting sliding contact with said collar surfaces between said collars, said ring member having at least one threaded bore extending transverse the tube longitudinal axis;
   an axially extending bolt threaded to said inserts for securing the first and second tubes to each other; and
   a transversely extending bolt adapted to secure a further tube thereto in an axial direction transverse the longitudinal axis of the first and second tubes, said bolt being threaded to said ring member threaded bore for securing the further tube to said first and second tubes.

2. The construction of claim 1 further including in said further tube:
   a) a bore extending along a longitudinal axis of said further tube which further tube longitudinal axis is transverse to said longitudinal axis of said first and second hollow metal tubes,
   b) a collar secured in said bore of said further tube at an end of said further tube,
   said collar having a bore extending axially along said further tube longitudinal axis and an exterior surface lying in a plane transverse Said collar bore,
   said collar bore being dimensioned to slide over and tightly engage a length of said transversely extending bolt proximal to said ring member when said exterior collar surface confronts said ring member, c) thread means spaced from said further tube end, and d) a screw secured to said thread means, there being present on said transversely extending bolt an annular groove distal to said ring member and to said length of said transversely extending bolt which is engaged in said further tube collar, said groove being located adjacent to and engaged by said screw when said exterior collar surface confronts said ring member and said collar bore engages said length of said transversely extending bolt, said screw, said bolt and said collar co-acting to lock the further tube to said ring member whereby said further tube is rotatable about said longitudinal axis of said first and second hollow metal tubes.

* * * * *